(12) United States Patent
Liu et al.

(10) Patent No.: US 10,755,736 B2
(45) Date of Patent: Aug. 25, 2020

(54) MICROWAVE-ASSISTED MAGNETIC RECORDING APPARATUS AND METHOD

(71) Applicant: Seagate Technology LLC, Cupertino, CA (US)

(72) Inventors: Xiong Liu, Singapore (SG); Lihong Zhang, Singapore (SG); PengBoon Khoo, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/524,544

(22) Filed: Jul. 29, 2019

(65) Prior Publication Data

US 2019/0392862 A1 Dec. 26, 2019

Related U.S. Application Data

(63) Continuation of application No. 16/249,438, filed on Jan. 16, 2019, which is a continuation of application
(Continued)

(51) Int. Cl.
*G11B 5/00* (2006.01)
*G11B 5/596* (2006.01)
(Continued)

(52) U.S. Cl.
CPC .......... *G11B 5/59688* (2013.01); *G11B 5/66* (2013.01); *G11B 20/10009* (2013.01);
(Continued)

(58) Field of Classification Search
CPC .......... G11B 5/59688; G11B 20/10046; G11B 2005/0024; G11B 5/3909; G11B 5/59627;
(Continued)

(56) References Cited

U.S. PATENT DOCUMENTS

| | | | |
|---|---|---|---|
| 7,791,838 B2 * | 9/2010 | Sato .......................... | G11B 5/02 360/125.02 |
| 8,630,060 B2 | 1/2014 | Mosendz et al. | |
| 8,760,806 B2 | 6/2014 | Igarashi et al. | |
| 8,861,120 B2 * | 10/2014 | Yang ........................ | G11B 5/66 360/324.2 |

(Continued)

FOREIGN PATENT DOCUMENTS

JP 2007-142746 * 7/2007 ............... G11B 5/39

*Primary Examiner* — Nabil Z Hindi
(74) *Attorney, Agent, or Firm* — Mueting Raasch Group

(57) ABSTRACT

A magnetic recording medium includes a recording surface comprising a first recording layer having a first ferromagnetic resonant frequency and a second recording layer having a second ferromagnetic resonant frequency. The first recording layer is configured for storing user data and the second recording layer configured for storing servo data. A recording head arrangement is configured for microwave-assisted magnetic recording (MAMR) and writing user data to the first recording layer. The recording head arrangement comprises a write pole configured to generate a write magnetic field, and a write-assist arrangement proximate the write pole. The write-assist arrangement is configured to generate a radiofrequency assist magnetic field at a frequency that corresponds to the first ferromagnetic resonant frequency. A reader of the recording head arrangement is configured to read combined signals from the first and second recording layers.

20 Claims, 8 Drawing Sheets

Related U.S. Application Data

No. 16/013,193, filed on Jun. 20, 2018, now Pat. No. 10,249,332.

(51) Int. Cl.
  *G11B 20/10* (2006.01)
  *G11B 20/12* (2006.01)
  *G11B 5/66* (2006.01)

(52) U.S. Cl.
  CPC .... *G11B 20/10046* (2013.01); *G11B 20/1217* (2013.01); *G11B 2005/0024* (2013.01)

(58) Field of Classification Search
  CPC ............ G11B 5/1278; G11B 2005/001; G11B 2005/0021; G11B 15/02
  USPC ........................ 360/55, 59, 75, 313, 328, 64
  See application file for complete search history.

(56) References Cited

U.S. PATENT DOCUMENTS

| | | | |
|---|---|---|---|
| 8,988,813 B2 | 3/2015 | Ajioka | |
| 9,355,680 B1 | 5/2016 | Jin et al. | |
| 9,390,733 B2 | 7/2016 | Etoh et al. | |
| 9,449,618 B2 | 9/2016 | Rivkin et al. | |
| 9,472,223 B1 | 10/2016 | Mendonsa et al. | |
| 9,607,645 B2* | 3/2017 | Fukuzawa | B82Y 10/00 |
| 9,640,203 B1* | 5/2017 | Buch | G11B 5/02 |
| 10,127,931 B2* | 11/2018 | Suto | G11B 5/012 |
| 10,210,894 B1* | 2/2019 | Suto | G11B 5/82 |
| 2001/0046098 A1 | 11/2001 | Hoskins et al. | |
| 2009/0262457 A1 | 10/2009 | Rivkin et al. | |
| 2011/0043943 A1 | 2/2011 | Igarashi et al. | |
| 2015/0103437 A1 | 4/2015 | Watanabe et al. | |
| 2015/0262603 A1 | 9/2015 | Tonooka et al. | |
| 2016/0267935 A1* | 9/2016 | Ikeda | G11B 5/667 |
| 2017/0256273 A1* | 9/2017 | Suto | G11B 5/012 |

* cited by examiner

MICROWAVE-ASSISTED MAGNETIC RECORDING APPARATUS AND METHOD

RELATED PATENT DOCUMENTS

This application is a continuation of U.S. patent application Ser. No. 16/249,438, filed Jan. 16, 2019, which is a continuation of U.S. patent application Ser. No. 16/013,193, filed Jun. 20, 2018, now U.S. Pat. No. 10,249,332, which are incorporated herein by reference in their entireties.

SUMMARY

Embodiments are directed to an apparatus including a magnetic recording medium having a recording surface comprising a first recording layer having a first ferromagnetic resonant frequency and a second recording layer having a second ferromagnetic resonant frequency. The first recording layer is configured for storing user data and the second recording layer configured for storing servo data. A recording head arrangement is configured for microwave-assisted magnetic recording (MAMR) and writing user data to the first recording layer. The recording head arrangement comprises a write pole configured to generate a write magnetic field, and a write-assist arrangement proximate the write pole. The write-assist arrangement is configured to generate a radiofrequency assist magnetic field at a frequency that corresponds to the first ferromagnetic resonant frequency. A reader of the recording head arrangement is configured to read combined signals from the first and second recording layers.

Embodiments are directed to an apparatus including a magnetic recording medium comprising a first recording surface and an opposing second recording surface. The first recording surface comprises a first recording layer configured for storing user data and having a first ferromagnetic resonant frequency, and a second recording layer configured for storing servo data and having a second ferromagnetic resonant frequency. The second recording surface comprises a third recording layer configured for storing user data and having a third ferromagnetic resonant frequency, and a fourth recording layer configured for storing servo data and having a fourth ferromagnetic resonant frequency. A first recording head arrangement is configured for MAMR and writing user data to the first recording layer. The first recording head arrangement comprises a first write pole configured to generate a write magnetic field, and a first write-assist arrangement proximate the first write pole. The first write-assist arrangement is configured to generate a radiofrequency assist magnetic field at a frequency that corresponds to the first ferromagnetic resonant frequency. The first recording head arrangement comprises a first reader configured to read combined signals from the first and second recording layers. A second recording head arrangement is configured for MAMR and writing user data to the third recording layer. The second recording head arrangement comprises a second write pole configured to generate a write magnetic field, and a second write-assist arrangement proximate the second write pole. The second write-assist arrangement is configured to generate a radiofrequency assist magnetic field at a frequency that corresponds to the third ferromagnetic resonant frequency. The second recording head arrangement comprises a second reader configured to read combined signals from the third and fourth recording layers.

Embodiments are directed to a method comprising moving a recording head arrangement configured for MAMR relative to a magnetic recording medium. The magnetic recording medium includes a recording surface comprising a first recording layer having a first ferromagnetic resonant frequency and a second recording layer having a second ferromagnetic resonant frequency. The second recording layer is configured for storing servo data. The method comprises generating a radiofrequency assist magnetic field having a frequency that corresponds to the first ferromagnetic resonant frequency. The method also comprises generating a write field to write user data to the first recording layer assisted by the assist magnetic field. The method further comprises reading combined signals from the first and second recording layers.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

Disk drives are data storage devices that store digital data in magnetic form on a rotating storage medium. Modern disk drives comprise of one or more rigid data disks that are coated with a magnetizable medium and mounted on the hub of a spindle motor for rotation at a constant high speed. An array of recording transducers, referred to as data heads or heads, are mounted to an actuator arm, and a servo system is used to move the actuator arm such that a particular head is positioned over a desired location for reading or writing information to and from the disk. During a write operation, the head writes data onto the disk and during a read operation the head senses the data previously written on the disk and transfers the information to an external environment.

Data on the data disk is typically stored on concentric circular tracks along the surface of the disk. Often, the disk is divided into several disk zones which contain regions of adjacent tracks with a common recording bit rate. A typical disk drive configuration intersperses servo information at various points along each track for maintaining accurate head positioning over the disk. Servo information is typically written to each track in designated servo burst sectors and divides each disk track into slices called data wedges. As the disk rotates, the head reads the servo information contained in the servo bursts and sends the servo information back to the servo system to make any necessary position adjustments to the actuator arm.

Figure 1:
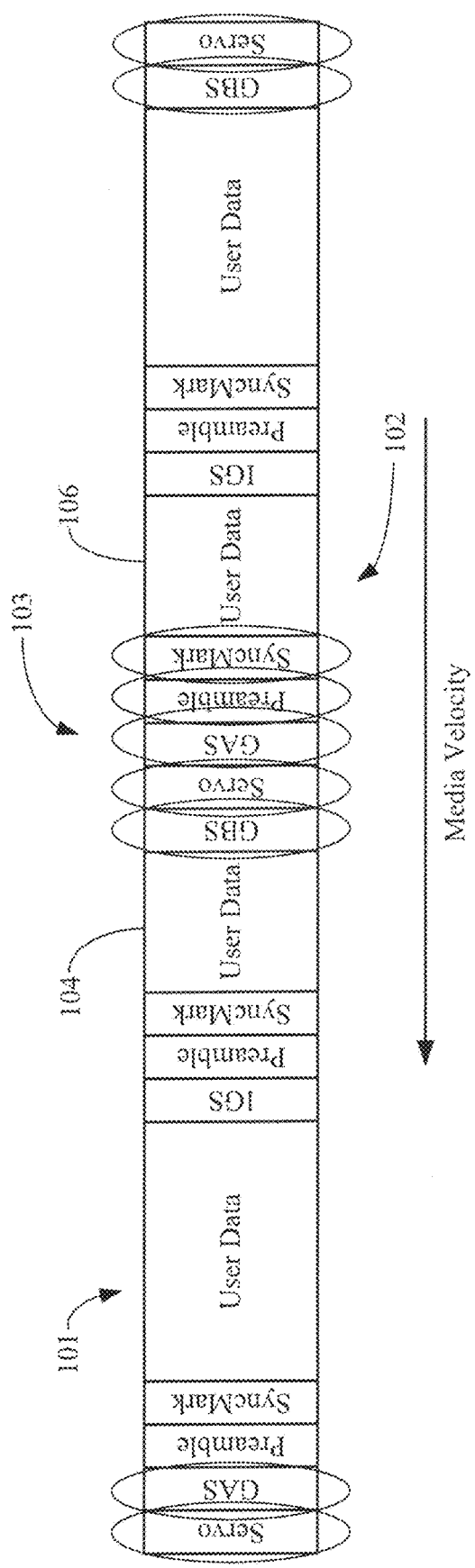
FIG. 1 illustrates a portion of a track of a typical magnetic recording medium which includes data sectors embedded with servo data.

FIG. 1 illustrates a portion of a track 101 of a typical magnetic recording medium which includes data sectors embedded with servo data. Every track 101 may be divided into discrete data sectors containing packets of user data. A data sector generally contains a user data field that is encapsulated with servo data to help identify and process the user data. The aerial density capability (ADC) of the magnetic recording medium is determined by a number of factors, including the track density kTPI (tracks per inch), the bit density kBPI (bits per inch), the recording area (RA), and the format efficiency (FE). The biggest contributor to format efficiency loss is due to the servo wedges, particularly in the case of a data sector split. For example, a servo wedge as shown in FIG. 1 includes GAS (gap after servo), servo data (servo), GBS (gap before servo), and a data sector split 102.

Because data sector fields are typically fixed-length fields, they may be required to split across a servo region 103 when an integer number of data sectors cannot fit within a data wedge. When a data sector split 102 occurs, a portion 104 of the data sector is located before the servo region 103 and another portion 106 of the data sector is located after the servo region 103. The format efficiency loss due to data sector splits 102 is substantial. In general, knowing which data sectors are split and where in the data sectors a split occurs is required for locating desired data on the data disk. One conventional method of tracking data sector splits on a disk is to store information about every data sector split occurrence in memory. The information stored about a split data sector may include the sector's zone location, data wedge number, sector number, and split count (where in the data sector the split occurs).

Data sector split information is typically determined and recorded in memory during the disk drive manufacturing process. By storing such information about each data sector split occurrence, accurate location of data on the disk drive is achieved. A drawback of storing information about every data sector split occurrence is that the memory required to store such information can be very large. Modern disk drives typically contain many thousands of split data sectors, and storing several data entries for each split data sector requires substantial memory. Reserving large amounts of memory for storing data sector splits may raise the production cost of the disk drive, consume the drive's resources, and slow the drive's performance.

Improving the format efficiency of a magnetic recording medium is difficult because the track density and format efficiency are inversely competing against each other on a single recording surface. For example, increasing the number of servo wedges on a single recording surface improves the servo-on-track capability for higher track densities, but it reduces the format efficiency. It is not possible to maximize servo wedge numbers and format efficiency on a single layer recording surface.

Embodiments of the disclosure are directed to systems and methods for increasing the aerial density capability of a magnetic recording system (e.g., a HDD). More particularly, embodiments of the disclosure are directed to systems and methods for increasing the aerial density capability of a magnetic recording system configured for microwave-assisted magnetic recording. According to various embodiments, the aerial density capability of a magnetic recording system can be increased by increasing (e.g., maximizing) the format efficiency using a recording head arrangement and a magnetic recording medium configured for microwave—assisted magnetic recording.

Embodiments of the disclosure are directed to magnetic recording systems that employ high-frequency assisted writing using a spin-torque oscillator (STO). This type of recording (e.g., microwave-assisted magnetic recording (MAMR)) applies a high frequency oscillatory assist magnetic field from the STO to the magnetic grains of the recording layer during a write operation. The assist field has a frequency the same as or close to the resonant frequency of the magnetic grains in the recording layer to facilitate the switching of the magnetization of the grains at lower write fields than would be possible without assisted recording. MAMR provides for an increase in the coercivity of the magnetic recording layer above that which could be written to by using conventional perpendicular magnetic recording alone. The increase in coercivity afforded by MAMR allows for a reduction in the size of the magnetic grains and thus a corresponding increase in recording density of the recording medium.

Figure 2C:
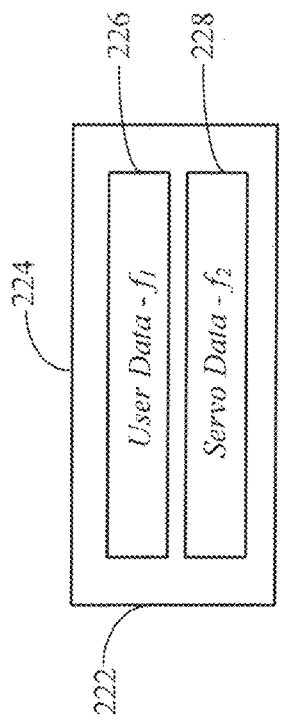
FIG. 2C is a downtrack sectional view of a magnetic recording medium having a recording surface comprising multiple recording layers with different ferromagnetic resonant frequencies for separately storing servo data and user data in accordance with various embodiments.
Figure 2D:
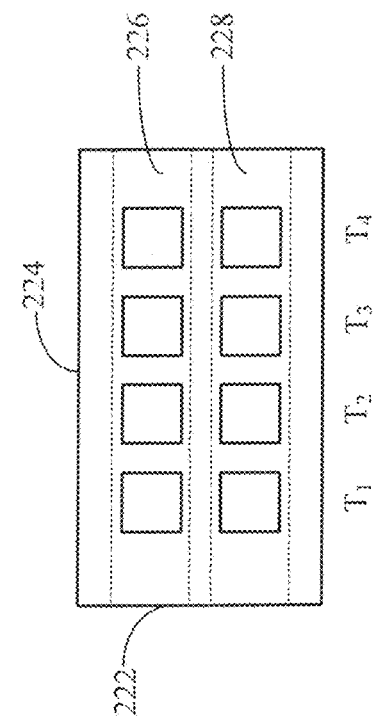
FIG. 2D is a cross-track sectional view of a magnetic recording medium having a recording surface comprising multiple recording layers with different ferromagnetic resonant frequencies for separately storing servo data and user data in accordance with various embodiments.
Figure 2A:
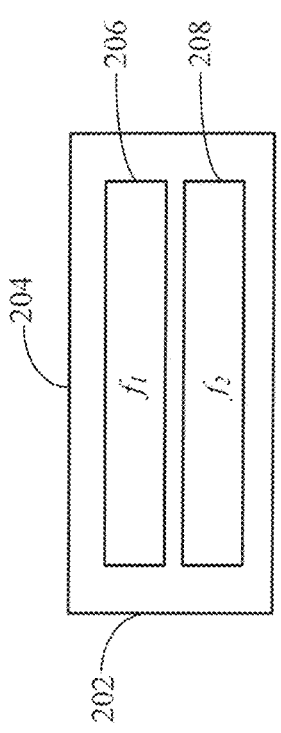
FIG. 2A is a downtrack sectional view of a magnetic recording medium having a recording surface comprising multiple recording layers with different ferromagnetic resonant frequencies for separately storing servo data and user data in accordance with various embodiments.

FIG. 2A is a downtrack sectional view of a magnetic recording medium 202 having a recording surface 204 comprising multiple recording layers each having a different ferromagnetic resonant frequency in accordance with various embodiments. According to the embodiment shown in FIG. 2A, the recording surface 204 includes a first recording layer 206 comprising magnetic material having a first ferromagnetic resonant frequency, $f_1$. The recording surface 204 includes a second recording layer 208 comprising magnetic material having a second ferromagnetic resonant frequency, $f_2$. In FIG. 2A and other figures, it is understood that the first ferromagnetic resonant frequency, $f_1$, is different from the second ferromagnetic resonant frequency, $f_2$. The first recording layer 206 is only writable when stimulated with write-assist energy at or near the first frequency, $f_1$. The second recording layer 208 is only writable when stimulated with write-assist energy at or near the second frequency, $f_2$. According to various embodiments, the first recording layer 206 is configured for storing user data, and the second recording layer 208 is configured for storing servo data. It is understood that, in some embodiments, the first recording layer 206 can be configured for storing servo data, and the second recording layer 208 can be configured for storing user data. In either configuration, the recording layer that stores user data is devoid of servo data.

Figure 2B:
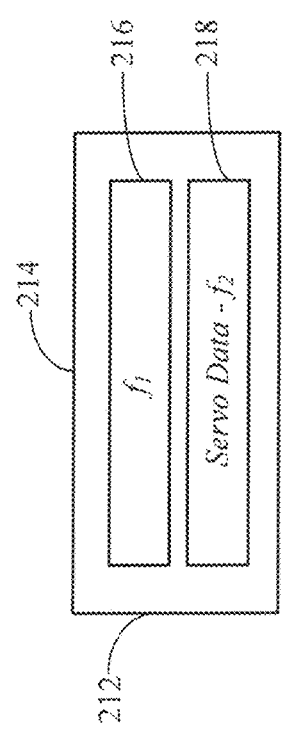
FIG. 2B is a downtrack sectional view of a magnetic recording medium having a recording surface comprising multiple recording layers with different ferromagnetic resonant frequencies for separately storing servo data and user data in accordance with various embodiments.

FIG. 2B is a downtrack sectional view of a magnetic recording medium 212 having a recording surface 214 comprising multiple recording layers each having a different ferromagnetic resonant frequency in accordance with various embodiments. The recording surface 214 includes a first recording layer 216 comprising magnetic material having a first ferromagnetic resonant frequency, $f_1$, and a second recording layer 218 comprising magnetic material having a second ferromagnetic resonant frequency, $f_2$. In the embodiment shown in FIG. 2B, servo data is written to the second recording layer 218 using a MAMR recording head configured to generate a radiofrequency (RF) assist magnetic field at a frequency that corresponds to the second ferromagnetic resonant frequency, $f_2$. Writing servo data to the second recording layer 218 of the recording surface 214 is typically performed at the factory, such as during media processing or drive factory testing. With the servo data written to the second recording layer 218, the first recording layer 216 of the recording surface 214 can now be used to store user data.

FIG. 2C is a downtrack sectional view of a magnetic recording medium 222 having a recording surface 224 comprising multiple recording layers each having a different ferromagnetic resonant frequency in accordance with various embodiments. The recording surface 224 includes a first recording layer 226 comprising magnetic material having a first ferromagnetic resonance frequency, $f_1$, and a second recording layer 228 comprising magnetic material having a second ferromagnetic resonant frequency, $f_2$. In the embodiment shown in FIG. 2C, servo data written to the second recording layer 228 is read to properly position a MAMR recording head, and user data is written to the first recording layer 226 using the MAMR recording head configured to generate an RF assisted magnetic field at a frequency that corresponds to the first ferromagnetic resonant frequency, $f_1$. Writing user data to the first recording layer 226 of the recording surface 224 is typically performed in the field (e.g., at a data center). FIG. 2D is a cross-track sectional view of the magnetic recording medium 222 shown in FIG. 2C looking in the plane of the medium 222 across four discrete tracks, $T_1$, $T_2$, $T_3$, and $T_4$. Each track includes user data written to the first recording layer 226 and servo data written to the second recording layer 228.

In the embodiments shown in FIGS. 2A-2D, all servo wedges that would conventionally be interspersed within user data on the first recording layer 206, 216, 226 are instead moved from the first recording layer 206, 216, 226 onto the second recording layer 208, 218, 228 of the same recording surface 204, 214, 224. A significant increase in data storage capacity is achieved by moving all servo wedges from the first recording layer 206, 216, 226 to the second recording layer 208, 218, 228. Servo data can be written to the second recording layer 208, 218, 228 at a much higher density than that on normal perpendicular magnetic recording (PMR) media to achieve higher track densities (kTPI) and aerial density capability (ADC). This results from the much larger surface area that is available on the second recording layer 208, 218, 228 relative to that on current embedded servo recording media. The ADC of the magnetic recording medium 202, 212, 222 is increased by increasing the track density capability through increasing servo wedge numbers on the second recording layer 208, 218, 228.

Figure 3A:
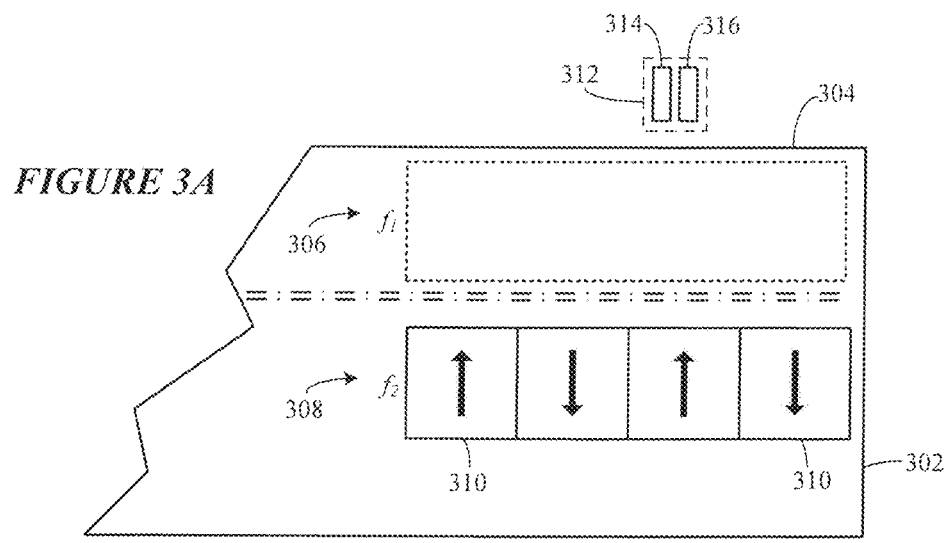
FIG. 3A is a downtrack sectional view of a magnetic recording medium having a recording surface comprising multiple recording layers with different ferromagnetic resonant frequencies for separately storing servo data and user data in accordance with various embodiments.

FIG. 3A is a downtrack sectional view of a magnetic recording medium having a recording surface comprising multiple recording layers with different ferromagnetic resonant frequencies for separately storing servo data and user data in accordance with various embodiments. FIG. 3A shows a magnetic recording medium 302 having a recording surface 304 positioned in proximity to a recording head arrangement 312. The recording surface 304 includes a first recording layer 306 having a first ferromagnetic resonant frequency, $f_1$, and a second recording layer 308 having a second ferromagnetic resonant frequency, $f_2$. The recording head arrangement 312 includes a write pole 314 configured to generate a write magnetic field and a write-assisted arrangement 316 proximate the write pole 314. In the embodiment shown in FIG. 3A, the recording head arrangement 312 is a component of a servo writer configured to write servo data 310 to the second recording layer 308 (e.g., at the factory). The write-assist arrangement 316 is configured to generate a radiofrequency assist magnetic field at a frequency that corresponds to the second ferromagnetic resonant frequency, $f_2$. After completing the servo writing process and other processes at the factory, the magnetic recording medium 302 shown in FIG. 3A can be installed in a hard disk drive for use in the field.

Figure 3B:
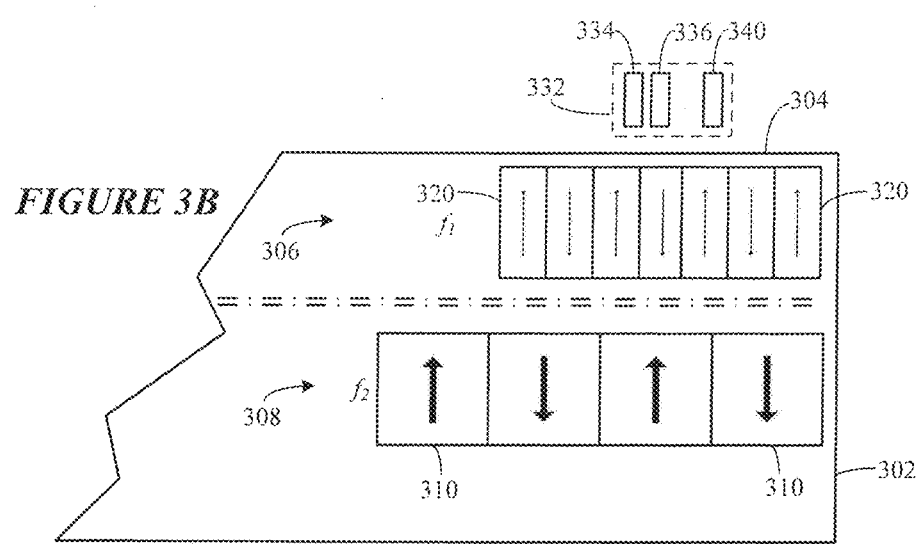
FIG. 3B shows the magnetic recording medium of FIG. 3A incorporated in a hard disk drive for use in the field.

FIG. 3B shows the magnetic recording medium 302 of FIG. 3A incorporated in a hard disk drive for use in the field. FIG. 3B shows the recording surface 304 of the magnetic recording medium 302 in proximity to a recording head arrangement 332. The recording head arrangement 332 includes a write pole 334 configured to generate a write magnetic field and a write-assist arrangement 336 proximate the write pole 334. In the embodiment shown in FIG. 3B, the recording head arrangement 332 is configured to write user data 320 to the first recording layer 306. The write-assist arrangement 336 is configured to generate a radiofrequency assist magnetic field at a frequency that corresponds to the first ferromagnetic resonant frequency, After user data 320 has been written to the first recording layer 306, a reader 340 of the recording head arrangement 332 is configured to read combined signals (user data and servo data) from the first and second recording layers 306, 308. As will be described below, the combined signals read by the reader 340 can be filtered and separated into a user data signal and a servo data signal.

Figure 4:
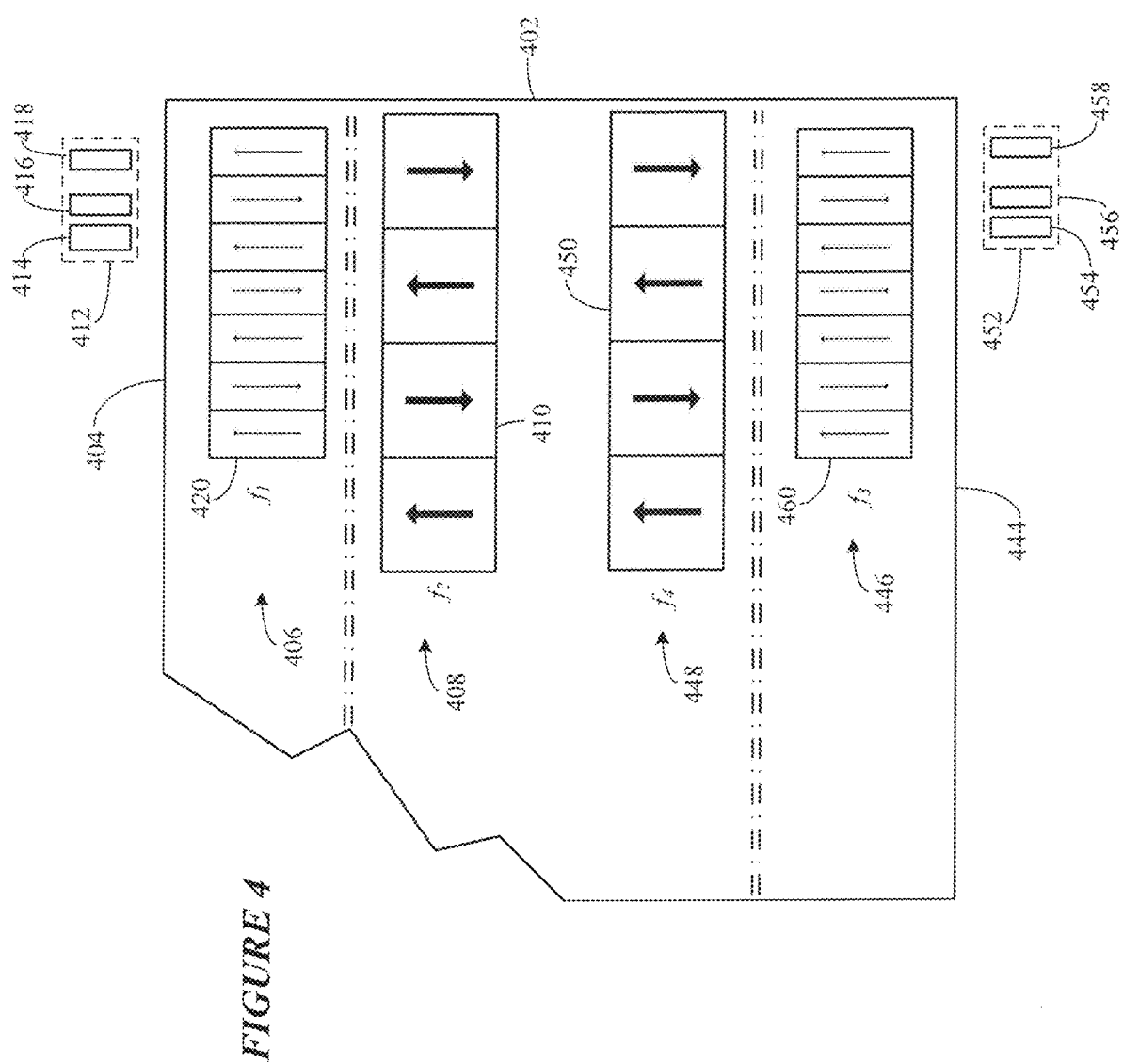
FIG. 4 is a downtrack sectional view of a magnetic recording medium having opposing recording surfaces each comprising multiple recording layers with different ferromagnetic resonant frequencies for separately storing servo data and user data in accordance with various embodiments.

FIG. 4 is a downtrack sectional view of a magnetic recording medium having opposing recording surfaces each comprising multiple recording layers with different ferromagnetic resonant frequencies for separately storing servo data and user data in accordance with various embodiments. FIG. 4 shows a magnetic recording medium 402 having a first recording surface 404 and an opposing second recording surface 444. The first recording surface 404 includes a first recording layer 406 having a first ferromagnetic resonant frequency, $f_1$, and a second recording layer 408 having a second ferromagnetic resonant frequency, $f_2$. The second recording surface 444 includes a third recording layer 446 having a third ferromagnetic resonant frequency, $f_3$, and a fourth recording layer 448 having a fourth ferromagnetic resonant frequency, $f_4$. In some embodiments, the third and fourth ferromagnetic resonant frequencies, $f_3$ and $f_4$, can be the same as the first and second ferromagnetic resonant frequencies, $f_1$ and $f_2$, respectively. In other embodiments, the third and fourth ferromagnetic resonant frequencies, $f_3$ and $f_4$, can be different from the first and second ferromagnetic resonant frequencies, $f_1$ and $f_2$, respectively.

A first recording head arrangement 412 is positioned proximate the first recording surface 404, and a second recording head arrangement 452 is positioned proximate the second recording surface 444. The first recording head arrangement 412 includes a write pole 414 configured to generate a write magnetic field and a write-assist arrangement 416 proximate the write pole 414. The write-assist arrangement 416 is configured to generate a radiofrequency assist magnetic field at a frequency that corresponds to the first ferromagnetic resonant frequency, $f_1$. The first recording head arrangement 412 includes a reader 418 configured to read combined signals from the first and second recording layers 406, 408 of the first recording surface 404. The second recording head arrangement 452 includes a write pole 454 configured to generate a write magnetic field and a write-assist arrangement 456 proximate the write pole 454. The write-assist arrangement 456 is configured to generate a radiofrequency assist magnetic field at a frequency corresponding to the third ferromagnetic resonant frequency, $f_3$. The second recording head arrangement 452 includes a reader 458 configured to read combined signals from the first and second recording layers 446, 448 of the second recording surface 444.

Figure 5:
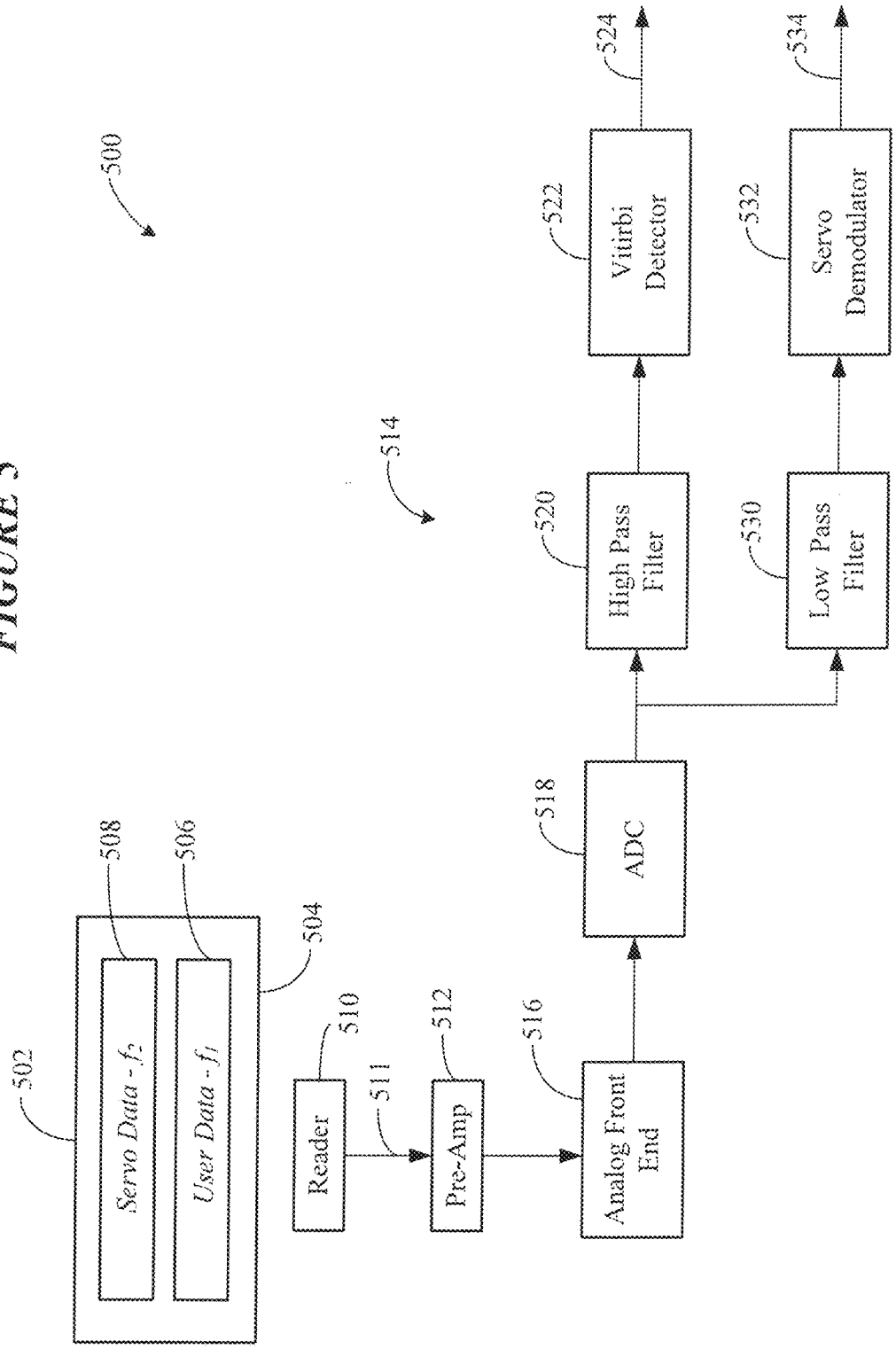
FIG. 5 illustrates components of a hard disk drive including a read channel for processing combined servo and user data readback signals obtained from multiple recording layers with different ferromagnetic resonant frequencies in accordance with various embodiments.

FIG. 5 illustrates components of a hard disk drive including a read channel for processing combined servo and user data readback signals obtained from multiple recording layers with different ferromagnetic resonant frequencies in accordance with various embodiments. The hard disk drive 500 includes a magnetic recording medium 502 having a recording surface 504 comprising a first recording layer 506 and a second recording layer 508. The first recording layer 506 comprises magnetic material having a first ferromagnetic resonant frequency, $f_1$, and the second recording layer 508 comprises magnetic material having a second ferromagnetic resonant frequency, $f_2$. User data is stored on the first recording layer 506, and servo data is stored on the second recording layer 508. A reader 510 is configured to sense the magnetic flux from the recording surface 504 and generates an analog readback waveform comprising combined signals read from the first and second recording layers 506, 508. The user data signals read from the first recording layer 506 and the servo data signals read from the second recording layer 508 have very different frequencies. For example, the user data signals typically have signal content at a frequency of about 2 GHz. The servo data signals typically have signal content at a frequency of about 200 MHz. This large frequency gap between the user data signals and the servo data signals can be readily differentiated by the read channel 514.

The combined readback signals 511 are communicated from the reader 510, to a preamplifier 512, and to an analog front end 516 of the read channel 514. The combined readback signals 511 are sampled by an analog-to-digital converter (ADC) 518. The samples produced by the ADC 518 are passed to a high-pass filter 520 and to a low pass filter 530. The high-pass filter 520 is configured to pass signal content of the combined readback signals 511 corresponding to the higher frequency user data signals. The higher frequency user data signals are communicated from the high-pass filter 520 to a Viterbi detector (e.g., SOVA) 522, the output of which corresponds to user data signals. The low pass filter 530 is configured to pass signal content of the combined readback signals 511 corresponding to the lower frequency servo data signals. The lower frequency servo data signals are communicated from the low-pass filter 530 to a servo demodulator 532, the output of which corresponds to servo data signals communicated to the servo system of the hard disk drive 500. It is noted that the magnetic recording medium 502 can include two opposing recording surfaces (see FIG. 4), and that a separate read channel 514 is provided for processing combined servo and user data readback signals obtained from the opposing recording surface.

Figure 6:
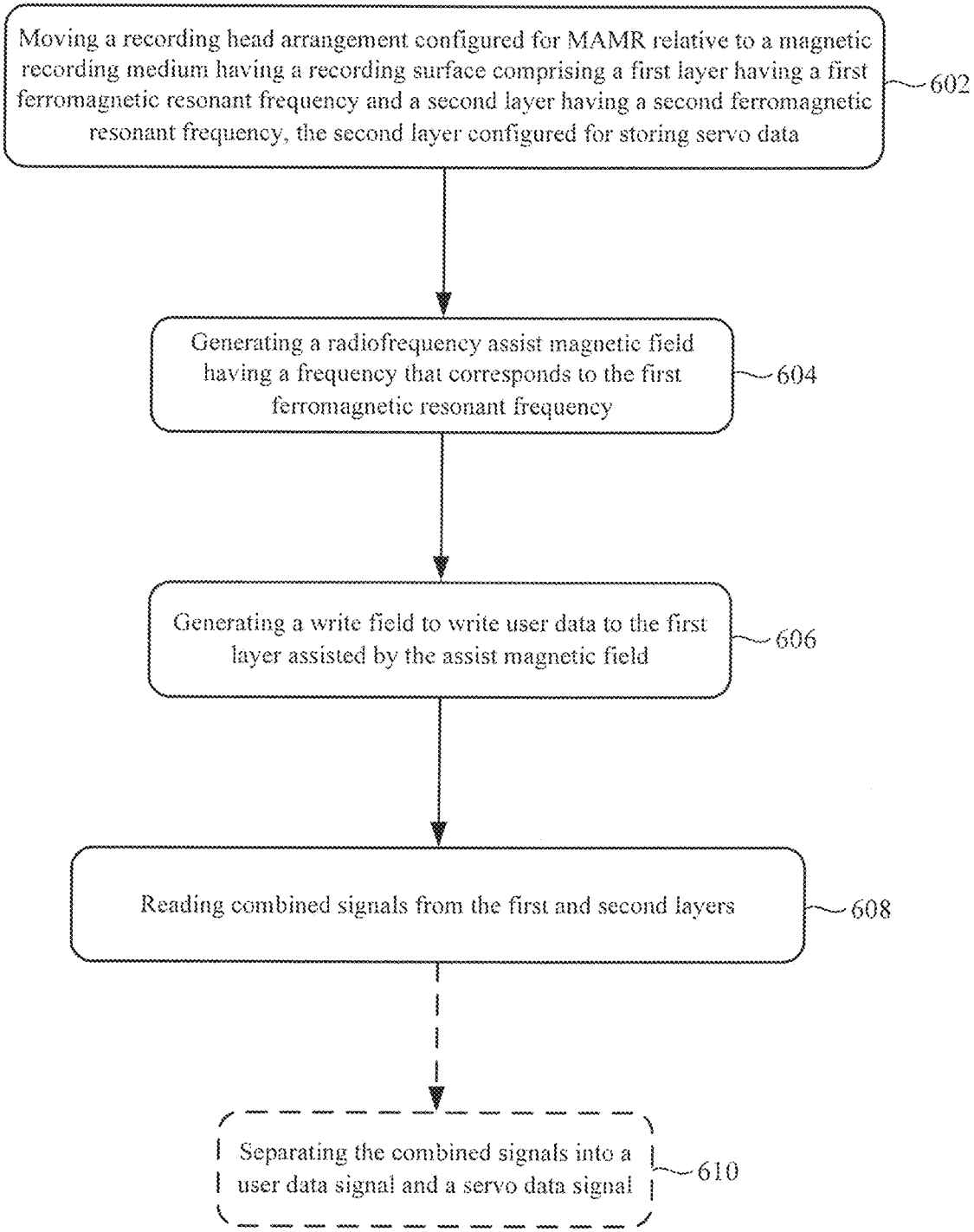
FIG. 6 illustrates a method of writing data to and reading data from a magnetic recording surface comprising recording layers with different ferromagnetic resonant frequencies for separately storing servo and user data in accordance with various embodiments.

FIG. 6 illustrates a method of writing data to and reading data from a magnetic recording surface comprising recording layers with different ferromagnetic resonant frequencies for separately storing servo and user data in accordance with various embodiments. The method shown in FIG. 6 involves moving 602 a recording head arrangement configured for MAMR relative to a magnetic recording medium having a recording surface comprising a first recoding layer and a second recording layer. The first recording layer has a first ferromagnetic resonant frequency, and the second recording layer has a second ferromagnetic resonant frequency. The second recording layer is configured for storing servo data. The method involves generating 604 a radiofrequency assist magnetic field having a frequency that corresponds to the first ferromagnetic resonant frequency. The method also involves generating 606 a write field to write user data to the first recording layer assisted by the assist magnetic field. The method further involves reading 608 combined signals from the first and second recording layers. The method may also involve separating 610 the combined signals into a user data signal and a servo data signal.

Figure 7:
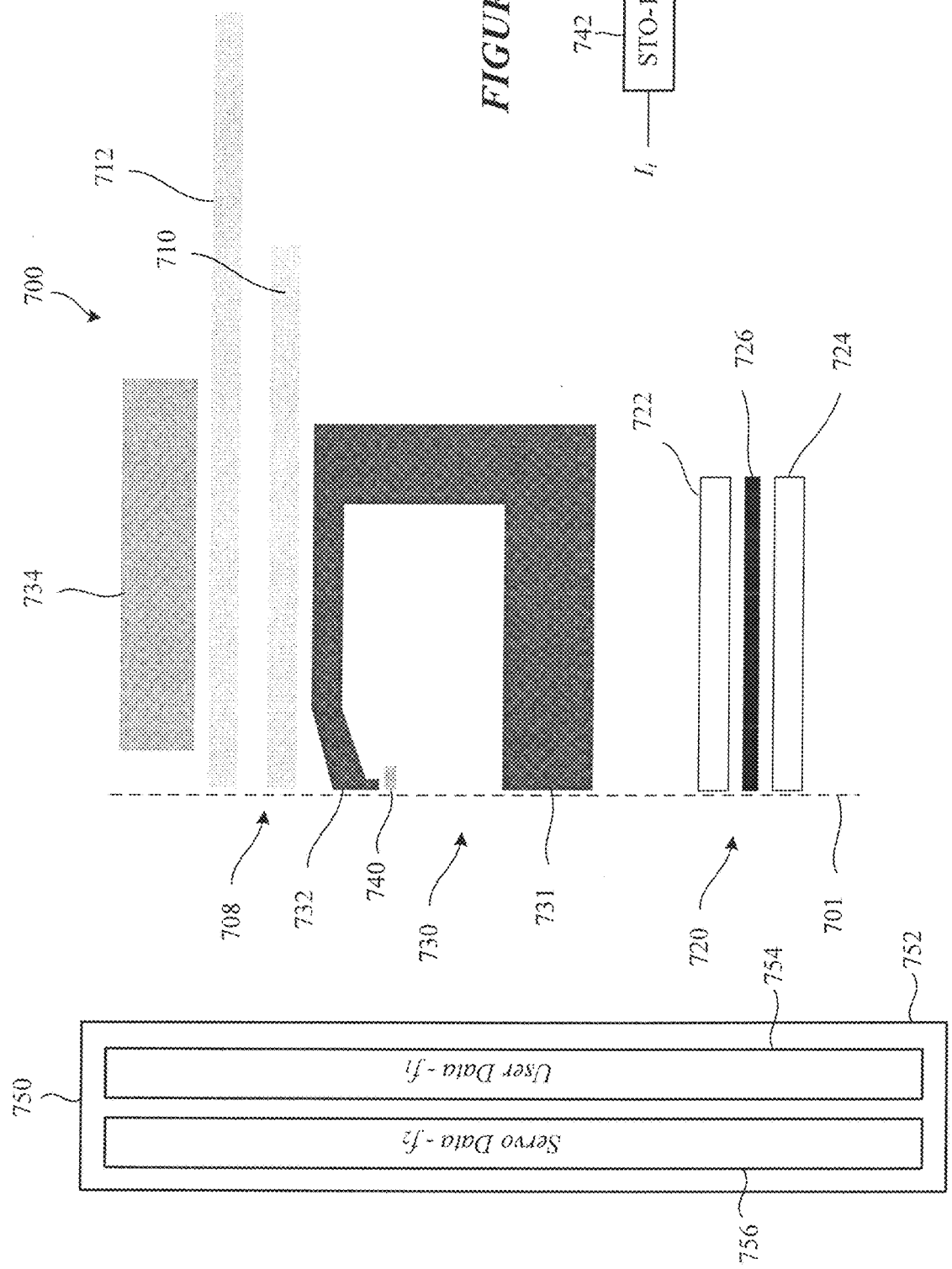
FIG. 7A shows a recording head arrangement configured for MAMR in accordance with various embodiments.
FIG. 7B shows a spin-torque oscillator of the write-assist arrangement illustrated in FIG. 7A.

FIG. 7A shows a recording head arrangement configured for MAMR in accordance with various embodiments. The recording head arrangement 700 includes a writer 730 and a reader 720 proximate an air bearing surface (ABS) 701 for respectively writing and reading data to/from a magnetic recording medium 750. The magnetic recording medium 750 includes a recording surface 752 comprising a first recording layer 754 and a second recording layer 756. The first recording layer 754 comprises magnetic material having a first ferromagnetic resonant frequency, $f_1$, and the second recording layer 756 comprises magnetic material having a second ferromagnetic resonant frequency, $f_2$. User data is stored on the first recording layer 754, and servo data is stored on the second recording layer 756.

The writer 730 includes a write pole 732 coupled to a return pole 731 and, in accordance with some embodiments, an axillary return pole 734. Although not shown in FIG. 7A, the auxiliary return pole 734 is coupled to the write pole 732 by way of a magnetic via. The writer 730 is shown positioned proximate a write coil arrangement 708. In the embodiment shown in FIG. 7A, the write coil arrangement 708 includes an upper coil 712 and a lower coil 710 (e.g., double-layer pancake coil design). In other embodiments, a single coil or helical coil design can be used instead of a double-layer pancake coil design. The reader 720 comprises a reader element 726 (e.g., giant magnetoresistance (GMR) sensor) disposed between a pair of reader shields 722 and 724.

The recording head arrangement 700 also includes a write-assist arrangement 740 positioned proximate the write pole 732. For example, the write-assist arrangement 740 can be positioned in the gap between the write pole 732 and the return pole 731, and is preferably situated adjacent the write pole 732. The write-assist arrangement 740 is configured to generate a radiofrequency assist magnetic field at a frequency corresponding to the first ferromagnetic resonant frequency, $f_1$ of the first recording layer 754. As is shown in FIG. 7B, the write-assist arrangement 740 includes an STO 742 configured to generate a first write-assist field having a first frequency $f_1$ (WAF-$f_1$). When writing to tracks having the first ferromagnetic resonant frequency, $f_1$, on the first recording layer 754, the STO 742 is energized by input of a drive current, $I_i$, at the appropriate time (e.g., preceding or concurrently with the write current).

Figure 8:
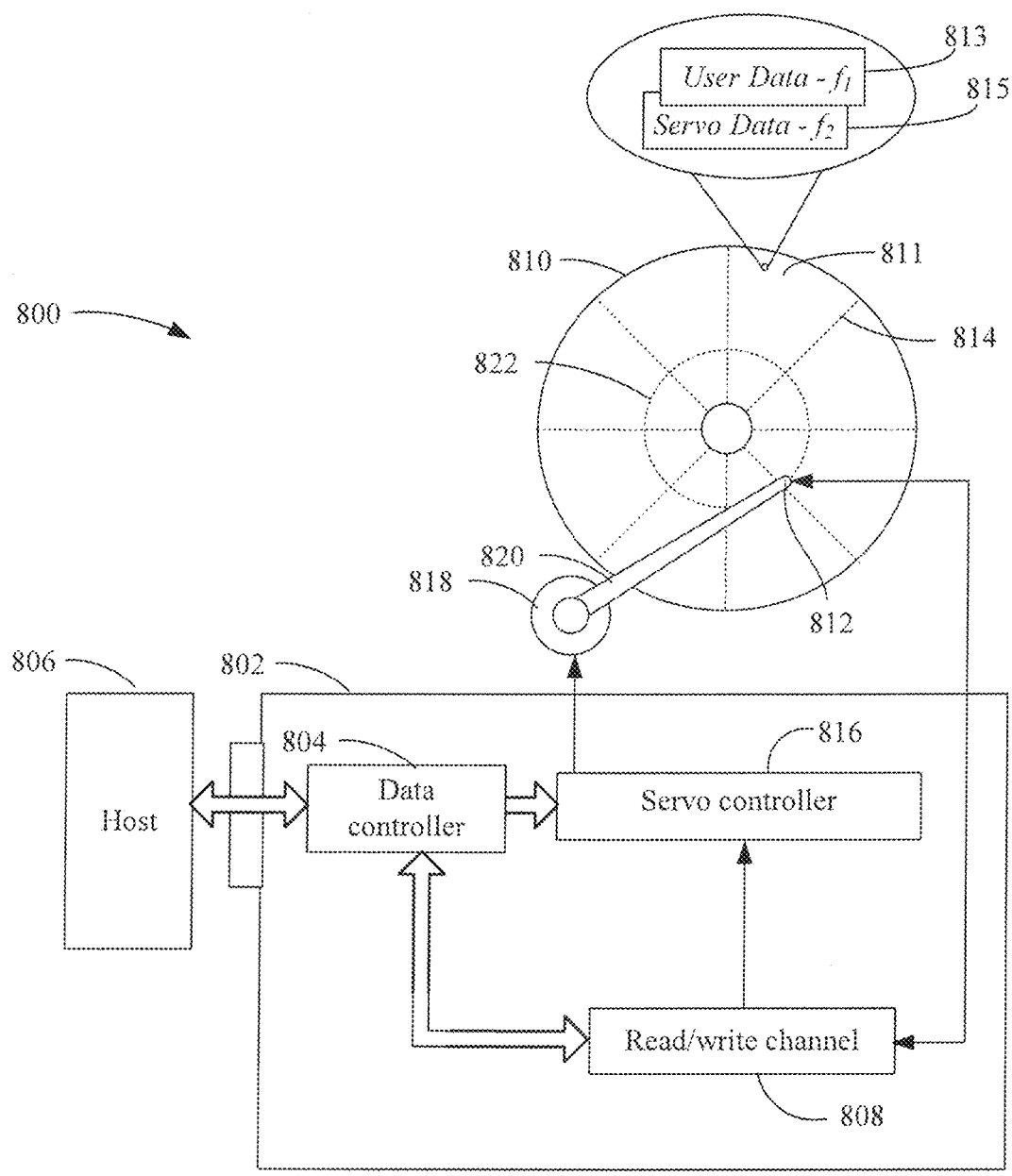
FIG. 8 is a block diagram of a data storage apparatus configured to write data to and read data from a magnetic recording surface comprising recording layers with different ferromagnetic resonant frequencies for separately storing servo and user data in accordance with various embodiments.

FIG. 8 is a block diagram of a data storage apparatus 800 (e.g., a HDD) configured to write data to and read data from a magnetic recording surface comprising recording layers with different ferromagnetic resonant frequencies for separately storing servo and user data in accordance with various embodiments. The data storage apparatus 800 includes a control logic circuit 802 which includes a data controller 804 that processes read and write commands and associated data from a host device 806. The host device 806 may include any electronic device that can be communicatively coupled to store and retrieve data from a data storage device, e.g., a computer. The data controller 804 is coupled to a read/write channel 808 and configured to read data from and write data to a recording surface 811 of a magnetic disk 810. The recording surface 811 includes a first recording layer 813 having a first ferromagnetic resonant frequency, $f_1$, and a second recording layer 815 having a second ferromagnetic resonant frequency, $f_2$. Servo data is stored on the second recording layer 815, and user data is stored on the first recording layer 813.

The read/write channel 808 generally converts data between the digital signals processed by the data controller 804 and the analog signals conducted through one or more read/write heads 812 configured for MAMR. The read/write channel 808 also provides servo data read from servo wedges 814 on the second recording layer 815 of the magnetic disk 810 to a servo controller 816. The servo controller 816 uses the servo data read from the second recording layer 815 to drive an actuator 818 (e.g., voice coil motor, or VCM and/or micro-actuator) that rotates an arm 820 upon which the read/write heads 812 are mounted.

Data within the servo wedges 814 on the second recording layer 815 can be used to detect the location of the read/write head 812. The servo controller 816 uses servo data read from the second recording layer 815 to move the read/write head 812 to an addressed track 822 and block on the first recording layer 813 in response to the read/write commands (seek mode). While user data is being written to and/or read from the first recording layer 813, servo data is concurrently read from the second recording layer 815 and used to maintain the read/write head 812 in alignment with the track 822 (track following mode).

Although two separate controllers 804 and 816 and a read/write channel 808 have been shown for purposes of illustration, it is to be understood that their functionality described herein may be integrated within a common integrated circuit package or distributed among more than one integrated circuit package. Similarly, a head/disk assembly can include a plurality of data storage disks 810, an actuator arm 820 with a plurality of read/write heads 812 (or other sensors) which are moved radially across different recording surfaces 811 of the disk(s) 810 by the actuator motor 818 (e.g., voice coil motor), and a spindle motor (not shown) which rotates the disks 810.

In some embodiments, a magnetic recording medium having a magnetic recording surface comprising recording layers with different ferromagnetic resonant frequencies for separately storing servo and user data can be configured for perpendicular magnetic recording (PMR). In other embodiments, a magnetic recording medium having a magnetic recording surface comprising recording layers with different ferromagnetic resonant frequencies for separately storing servo and user data can be configured for bit patterned magnetic recording (BPMR). A BPMR medium provides patterns of magnetic regions (e.g., "dots", "islands" or "blocks") within non-magnetic material (e.g., "troughs"). In bit patterned media, the magnetic material on a disk is patterned into small isolated islands such that there is a single magnetic domain in each island or "bit". The single magnetic domains can be a single grain or a few strongly coupled grains that switch magnetic states in concert as a single magnetic volume. To produce the required magnetic isolation of the patterned islands, the regions between the islands (e.g., troughs) are essentially nonmagnetic. According to various embodiments, the ferromagnetic resonant frequency of a particular track (discrete or bit patterned) of a magnetic recording medium can range between about 10 GHz and 40 GHz, such as between 20 GHz and 30 GHz.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. All references cited within are herein incorporated by reference in their entirety.

What is claimed is:

1. An apparatus, comprising:
   a magnetic recording medium comprising a plurality of recording layers arranged in a depth direction of the medium, each of the plurality of recording layers having a different ferromagnetic resonant frequency, wherein at least one of the plurality of recording layers is devoid of servo data; and
   a recording head arrangement configured for microwave-assisted magnetic recording (MAMR) and writing data to the plurality of recording layers, the recording head arrangement configured to generate a radiofrequency assist magnetic field at a frequency that corresponds to each of the different ferromagnetic resonant frequencies of the plurality of recording layers.

2. The apparatus of claim 1, wherein the magnetic recording medium comprises more than two recording layers.

3. The apparatus of claim 1, wherein the magnetic recording medium comprises at least three recording layers.

4. The apparatus of claim 1, wherein the magnetic recording medium comprises at least four recording layers.

5. The apparatus of claim 1, wherein the plurality of recording layers are distributed on a same recording surface of the magnetic recording medium.

6. The apparatus of claim 1, wherein the plurality of recording layers are distributed on two opposing recording surfaces of the magnetic recording medium.

7. The apparatus of claim 1, wherein at least two of the plurality of recording layers are configured to store user data.

8. The apparatus of claim 1, wherein at least one of the plurality of recording layers is configured to store only servo data.

9. The apparatus of claim 1, wherein the recording head arrangement comprises:
   a write pole arrangement configured to generate write magnetic fields; and
   a write-assist arrangement proximate the write pole arrangement, the write-assist arrangement configured to generate the radiofrequency assist magnetic fields at frequencies that correspond to the different ferromagnetic resonant frequencies of the plurality of recording layers.

10. An apparatus, comprising:
    a magnetic recording medium comprising a plurality of recording layers arranged in a depth direction of the medium, each of the plurality of recording layers having a different ferromagnetic resonant frequency, wherein at least one of the plurality of recording layers is devoid of servo data;
    a recording head arrangement configured for microwave-assisted magnetic recording (MAMR) and writing data to the plurality of recording layers, the recording head arrangement configured to generate a radiofrequency assist magnetic field at a frequency that corresponds to each of the different ferromagnetic resonant frequencies of the plurality of recording layers;
    a reader arrangement configured to read signals from the plurality of recording layers; and
    a channel coupled to the reader arrangement and comprising a filter arrangement, the filter arrangement configured to separate user data signals from the signals read by the reader arrangement.

11. The apparatus of claim 10, wherein the filter arrangement is configured to separate servo data signals from the signals read by the reader arrangement.

12. The apparatus of claim 10, wherein the magnetic recording medium comprises more than two recording layers.

13. The apparatus of claim 10, wherein the magnetic recording medium comprises at least three recording layers.

14. The apparatus of claim 10, wherein the magnetic recording medium comprises at least four recording layers.

15. The apparatus of claim 10, wherein the plurality of recording layers are distributed on a same recording surface of the magnetic recording medium.

16. The apparatus of claim 10, wherein the plurality of recording layers are distributed on two opposing recording surfaces of the magnetic recording medium.

17. The apparatus of claim 10, wherein at least two of the plurality of recording layers are configured to store user data.

18. The apparatus of claim 10, wherein at least one of the plurality of recording layers is configured to store servo data.

19. The apparatus of claim 10, wherein the recording head arrangement comprises:
    a write pole arrangement configured to generate write magnetic fields; and
    a write-assist arrangement proximate the write pole arrangement, the write-assist arrangement configured to generate the radiofrequency assist magnetic fields at frequencies that correspond to the different ferromagnetic resonant frequencies of the plurality of recording layers.

20. A method, comprising:
    moving a recording head arrangement configured for microwave-assisted magnetic recording (MAMR) relative to a magnetic recording medium, the magnetic recording medium comprising a plurality of recording layers arranged in a depth direction of the medium, each of the plurality of recording layers having a different ferromagnetic resonant frequency, wherein at least one of the plurality of recording layers is devoid of servo data;
    generating, using the recording head arrangement, radiofrequency assist magnetic fields having frequencies that correspond to the different ferromagnetic resonant frequencies of the plurality of recording layers;
    generating write fields; and
    writing data to the plurality of recording layers using the write fields and the assist magnetic fields.

* * * * *